(No Model.)
J. W. DAVIS & J. B. FARRINGTON.
ELECTRIC MOTOR.
No. 459,678. Patented Sept. 15, 1891.
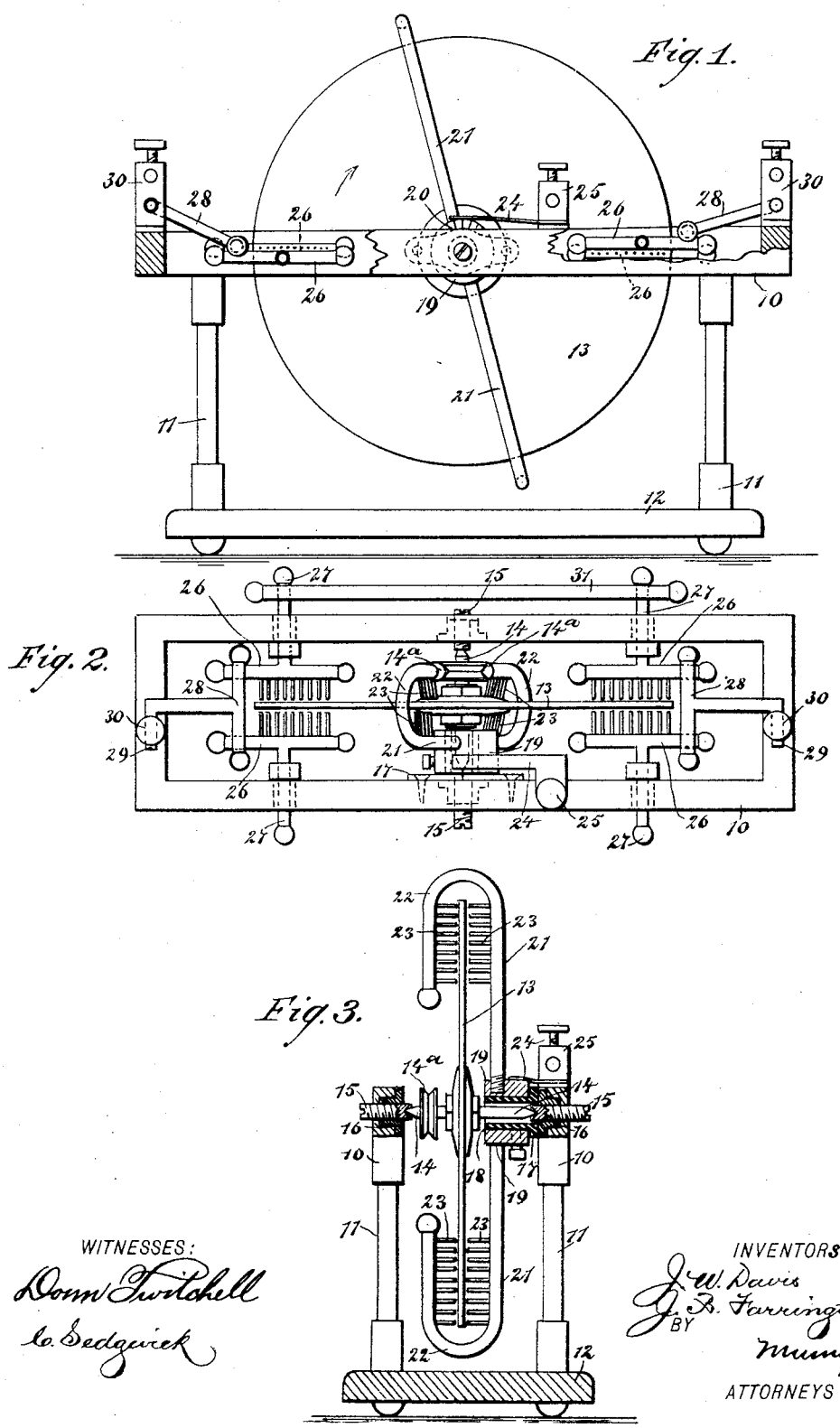

UNITED STATES PATENT OFFICE.

JOHN W. DAVIS AND JOHN B. FARRINGTON, OF NEW YORK, N. Y.

ELECTRIC MOTOR.

SPECIFICATION forming part of Letters Patent No. 459,678, dated September 15, 1891.

Application filed May 5, 1891. Serial No. 391,608. (No model.)

*To all whom it may concern:*

Be it known that we, JOHN W. DAVIS and JOHN B. FARRINGTON, of the city, county, and State of New York, have invented a new and Improved Electric Motor, of which the following is a full, clear, and exact description.

Our invention relates to electric motors; and the object of our invention is to produce an extremely simple form of electric motor which is adapted for the use of students and for experimental purposes, which is especially intended to be operated by static charges, and which is provided with means for using a different number of combs, and which is also adapted to have the electricity thrown upon one side of the main disk only, if desired.

To this end our invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a broken sectional side elevation of the motor. Fig. 2 is a plan view of the same, and Fig. 3 is a vertical cross-section of the machine.

The motor is provided with an open frame 10, which is preferably rectangular and which is supported in a horizontal position on legs 11, and the legs are secured at their lower ends to a suitable base 12. A dielectric disk 13 is mounted centrally in the frame 10, so as to revolve in a vertical plane, and the disk is secured to a central shaft 14, having tapering ends, and these ends are pivoted in the inner socketed ends of screws 15, which screws thus form bearings for the shaft, and the screws are held in nuts 16, which are sunk into the inner sides of the frame, and the bearings for the shaft are suitably insulated, so that the electricity on the disk cannot be grounded. The disk-shaft 14 is provided with a suitable pulley 14ª, and to this a small belt may be connected, so as to run any light mechanism.

Secured to one side of the frame 10 and on the inner part thereof is a strip 17, which has an inwardly-extending sleeve 18, and this sleeve loosely encircles the shaft 14, and the sleeve and strip are made of insulating material, preferably rubber, so as to insulate the hub 19, which is mounted upon the sleeve. This hub is held in a fixed position by a suitable set-screw and is provided on the outer end with gage-marks, which thus serve as a protractor, as shown at 20, and by bringing certain of these marks into alignment with a mark on the center of the plate or strip 17, as shown in Fig. 2, the arms 21, which extend radially from opposite sides of the hub, are brought into a desired position. These arms 21 extend outward beyond the periphery of the disk 13 and are doubled over the same, as shown at 22, and to the opposite portions of the arms are secured metallic teeth 23, which thus form combs, and the ends of the teeth nearly touch the disk and serve to conduct the electricity to it.

The electricity is supplied to the combs, the arms, and the hub by means of a contact-strip 24, which rests upon the hub and is secured to a binding-post 25, a suitable connection being made with the binding-post in the usual manner. Arranged on opposite edges of the disk 13 and at nearly right angles to the combs 23 are combs 26, having similar teeth, and these combs are made in two parts, each part having a shank 27, which is mounted and suitably insulated in the frame 10, and the combs 26 are adapted to receive the discharges from the disk.

It will be noticed by reference to Figs. 2 and 3 that the combs 23 on the different sides of the disk are arranged in slightly different planes, and the combs 26 are also arranged in the same manner. This is to give a little lead to the current and prevent the electricity in one comb from neutralizing the electricity in the opposite comb and thus holding the disk at a standstill. The outer ends of the combs 26 project beyond the periphery of the disk 13, as best shown in Fig. 2, and contact is made with these combs by means of the T-shaped conductors 28, the shanks of which are made to extend above the ends of the frame 10, and are bent at right angles, as shown at 29, and the bent portions are pivotally connected to the binding-posts 30, which posts are secured to the frame 10 in the usual manner, and the T-shaped conductors are thus capable of a vertical swinging motion, so that they may be placed out of contact with the combs.

The shanks 27 of the combs 26 are connected on one side of the machine by a conducting-bar 31, and when all the combs are used the current will flow through one T-shaped conductor and into one of the combs 26, thence through the conducting-bar 31 and into the opposite pair of combs, and thence upon the disk; but, if desired, the bar 31 may be removed and one pair of combs 26 may be connected with the positive pole of a source of electric supply and the other pair with the negative pole, and in this case the combs 23 are not used. In ordinary cases, however, the disk is provided with an even number of combs, which are arranged in pairs, as shown, and the alternate pairs are supplied with positive and negative electricity.

In illustrating the working of the machine we will suppose that the several combs are connected as described, that the binding-posts 30 are connected with the positive pole of an electric machine or other source of electric supply, and that the binding-post 25 is connected with the negative pole. It will thus be seen that the combs 26 will thus be positively charged and the combs 23 will be negatively charged. The positive electricity will therefore pass from the combs 26 upon the disk 13, and as soon as the electricity is collected on the disk the combs 26 will have a tendency to repel those portions of the disk nearest to them, and the negative combs 23 will tend to attract those portions which have been positively charged, and as a result the disk 13 and the shaft 14 will be rotated. If the arms 21, which carry the combs 23, are arranged at exactly right angles to the combs 26, it will be necessary to start the disk 13 before it will be operated on by the combs; but after it has once started the current will keep it in motion. The arms 21 are capable of swinging by moving the hub 19, and they may be thus brought into a position to make the disk work efficiently.

In operating the machine the electricity is preferably supplied by an electric machine, Leyden jar, or some similar source of supply, which will produce the electricity in static charges upon the surface of the disk 13.

The machine is not intended to furnish any great amount of power, but is used simply to illustrate to students how electrical energy is converted into mechanical energy. It will be noticed that the combs 26 are arranged and connected in such a manner that a greater or less number of them may be thrown into a circuit according to the nature of the experiment to be made, and, if desired, one comb 26 on each side of the disk may be arranged and connected so as to produce static charges of positive and negative electricity on the sides of the disk.

Having thus fully described our invention, we claim as new and desire to secure by Letters Patent—

1. In an electric motor, an electrically-rotated disk having insulated bearings, a hub concentric with the axis of the disk and having radial arms provided at their outer ends with pairs of combs between which the disk revolves and a contact plate or strip resting on the hub, substantially as set forth.

2. An electric motor comprising a frame, a revoluble disk mounted therein, a series of combs arranged in pairs around the disk, the combs of each pair being slightly in different horizontal planes, and positive and negative connections for the alternate pairs of combs, substantially as described.

3. In an electric motor, the combination, with a main frame and a revoluble disk mounted therein, of pairs of combs arranged on diametrically-opposite sides of the disk, a revoluble insulated hub arranged to turn concentrically about the disk-shaft, radiating-arms secured to the hub and carrying combs which embrace diametrically-opposite edges of the disk, and electric connections for the various combs, substantially as described.

4. The combination, with a main frame and a revoluble disk mounted therein, of combs arranged in pairs near diametrically-opposite edges of the disk, and swinging conductors to contact with the combs, substantially as shown and described.

5. The combination of a main frame, a revoluble disk mounted therein, combs arranged in pairs to embrace diametically-opposite edges of the disk, said combs having shanks which project beyond the sides of the frame, a removable conducting-bar connecting two of the comb-shanks, and electric connections for the combs, substantially as described.

JOHN W. DAVIS.
JOHN B. FARRINGTON.

Witnesses:
JNO. K. GORE,
AUGUSTE L. SEVESTRE.